US00RE47140E

(19) United States
(12) Reissued Patent
Biselx et al.

(10) Patent Number: US RE47,140 E
(45) Date of Reissued Patent: Nov. 27, 2018

(54) MICROMETER

(71) Applicant: TESA SA, Renens (CH)

(72) Inventors: Frédéric Biselx, Yens (CH); Stéphane Karawa, Lausanne (CH)

(73) Assignee: TESA SA, Renens (CH)

(21) Appl. No.: 29/557,731

(22) Filed: Mar. 11, 2016

Related U.S. Patent Documents

Reissue of:
(64) Patent No.: Des. 744,359
Issued: Dec. 1, 2015
Appl. No.: 29/492,829
Filed: Jun. 3, 2014

(30) Foreign Application Priority Data

Dec. 11, 2013 (WO) ..... 780199301

(51) LOC (11) Cl. ..... 10-04
(52) U.S. Cl.
USPC ..... D10/73
(58) Field of Classification Search
USPC ..... D10/73, 74, 79, 80
CPC . G01B 3/20; G01B 3/205; G01B 5/24; G01B 3/18; G01B 3/008
See application file for complete search history.

(56) References Cited

U.S. PATENT DOCUMENTS

D254,655 S * 4/1980 Brickwood ..... D10/73
D256,339 S * 8/1980 Konishi ..... D10/73
4,255,861 A * 3/1981 Nakata et al. ..... 33/819
D263,809 S * 4/1982 Suwa et al. ..... D10/73
D268,740 S * 4/1983 Tanada ..... D10/73
D273,468 S * 4/1984 Ueda et al. ..... D10/73
D273,469 S * 4/1984 Ueda et al. ..... D10/73
D273,664 S * 5/1984 Sakata ..... D10/73
(Continued)

*Primary Examiner* — Darlington Ly
(74) *Attorney, Agent, or Firm* — Maschoff Brennan

(57) CLAIM

The ornamental design for a micrometer, as shown and described.

DESCRIPTION

[FIG. 1 is an upper perspective view of an exemplary micrometer;]
[FIG. 2 is a front view of the micrometer;]
[FIG. 3 is a rear view of the micrometer;]
[FIG. 4 is a bottom view of the micrometer;]
[FIG. 5 is a top view of the micrometer;]
[FIG. 6 is a left side view of the micrometer;]
[FIG. 7 is a front view of another exemplary micrometer, with the other views the same as shown above in connection with FIG. 1; and,]
[FIG. 8 is a front view of still another exemplary micrometer, with the other view the same as shown above in connection with FIG. 1.]
*FIG. 9 is a top and front perspective view of a micrometer;*
*FIG. 10 is a front elevation view of the micrometer;*
*FIG. 11 is a rear elevation view of the micrometer;*
*FIG. 12 is a left side elevation view of the micrometer;*
*FIG. 13 is a top plan view of the micrometer; and,*
*FIG. 14 is a bottom plan view of the micrometer.*

1 Claim, 14 Drawing Sheets

Figure 1:
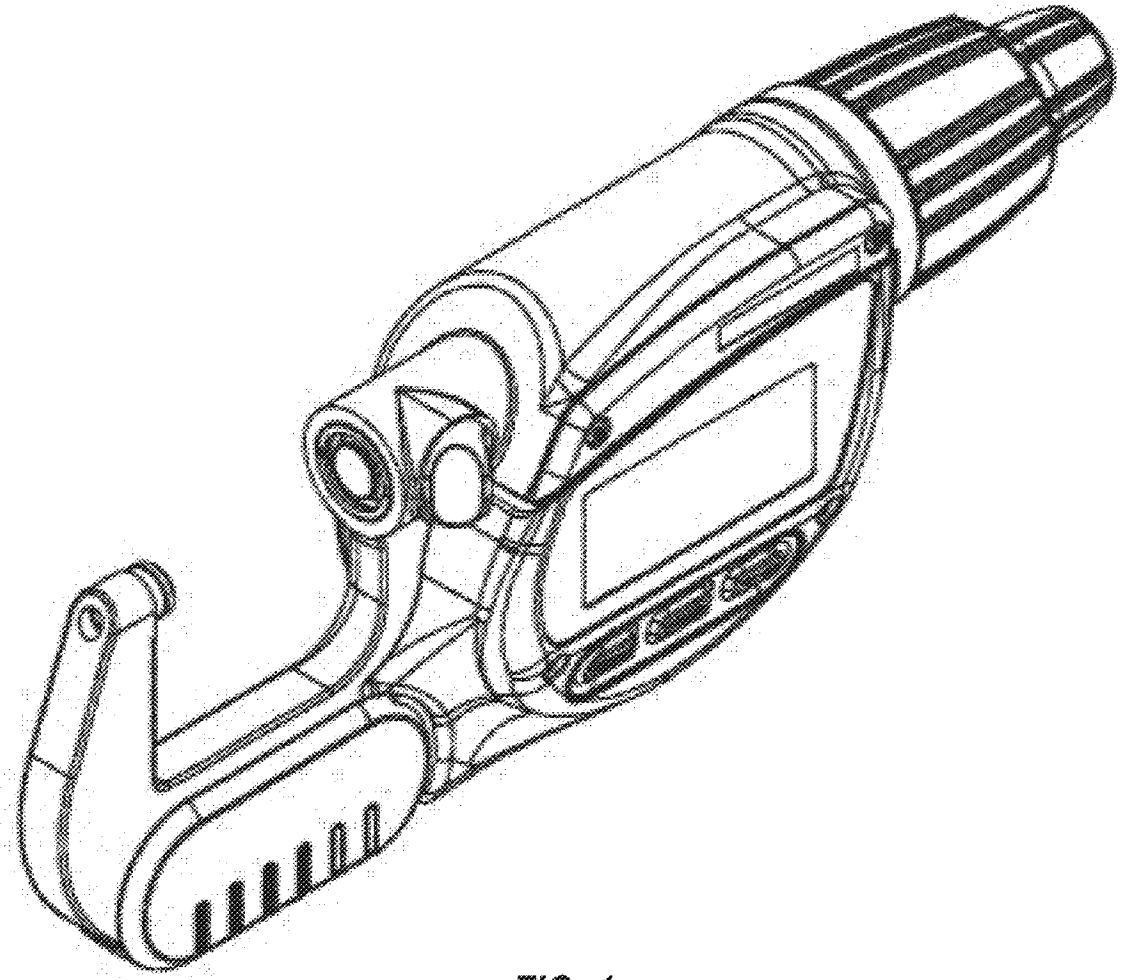
Figure 2:
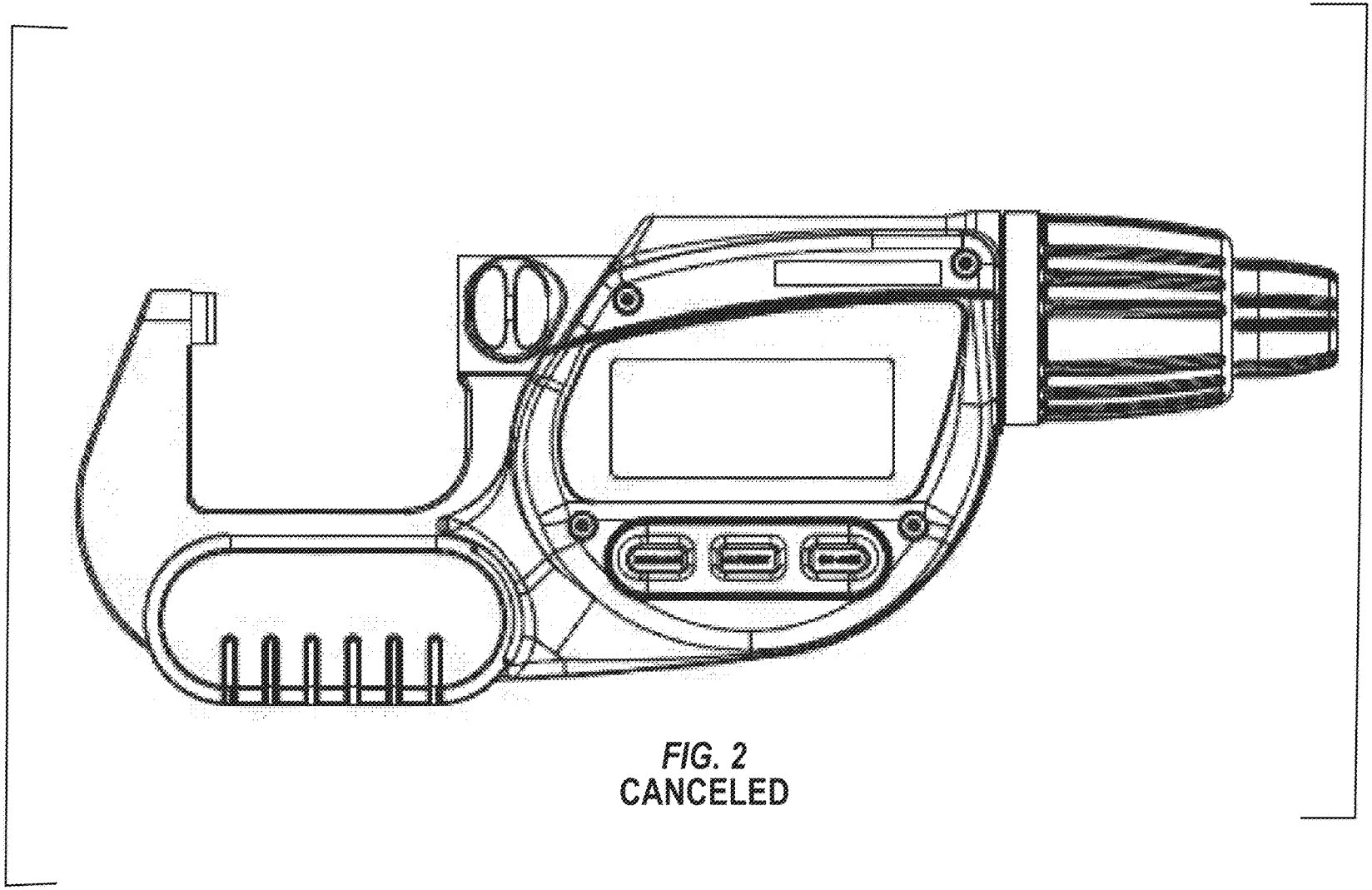
Figure 3:
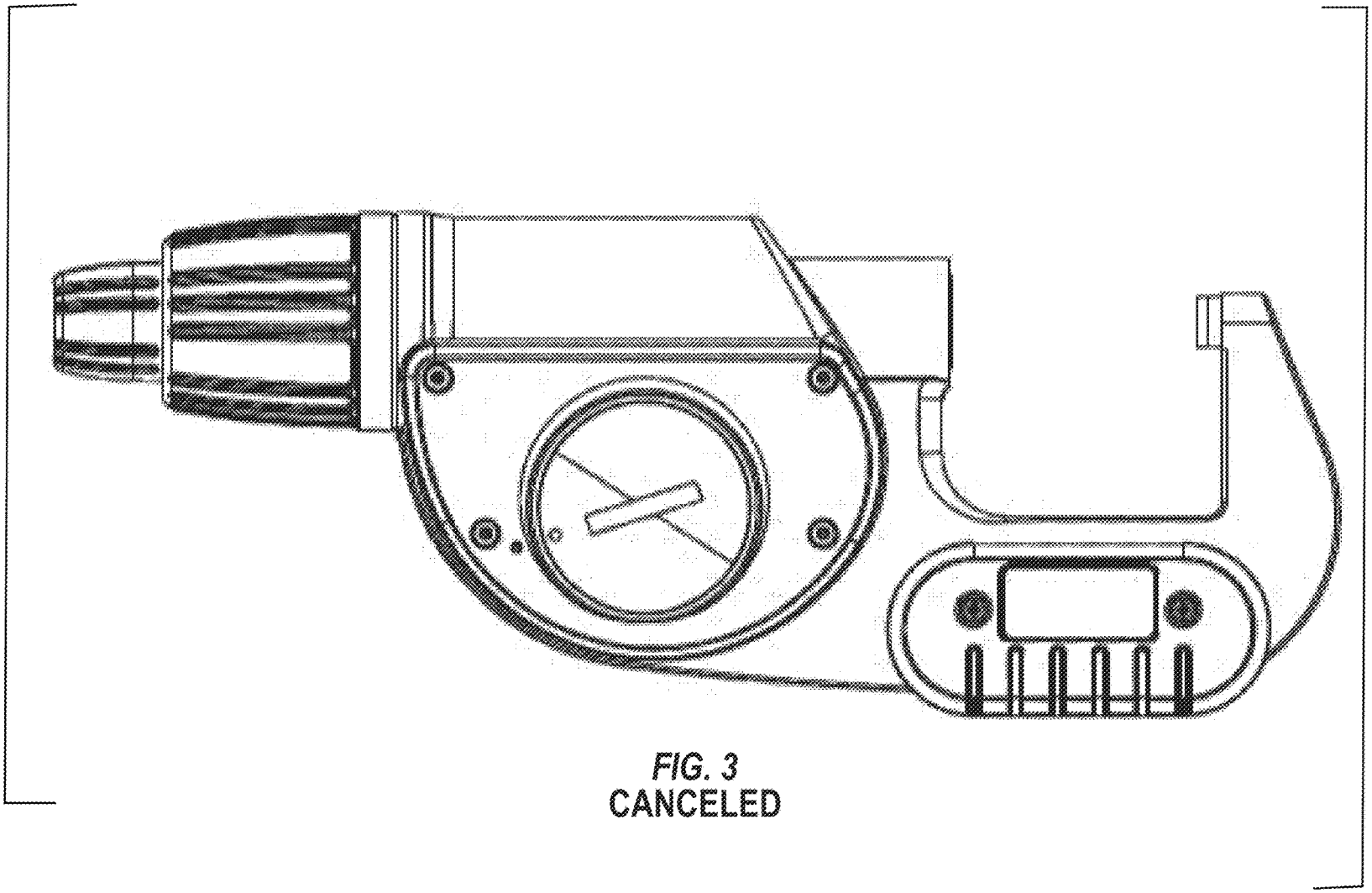
Figure 4:
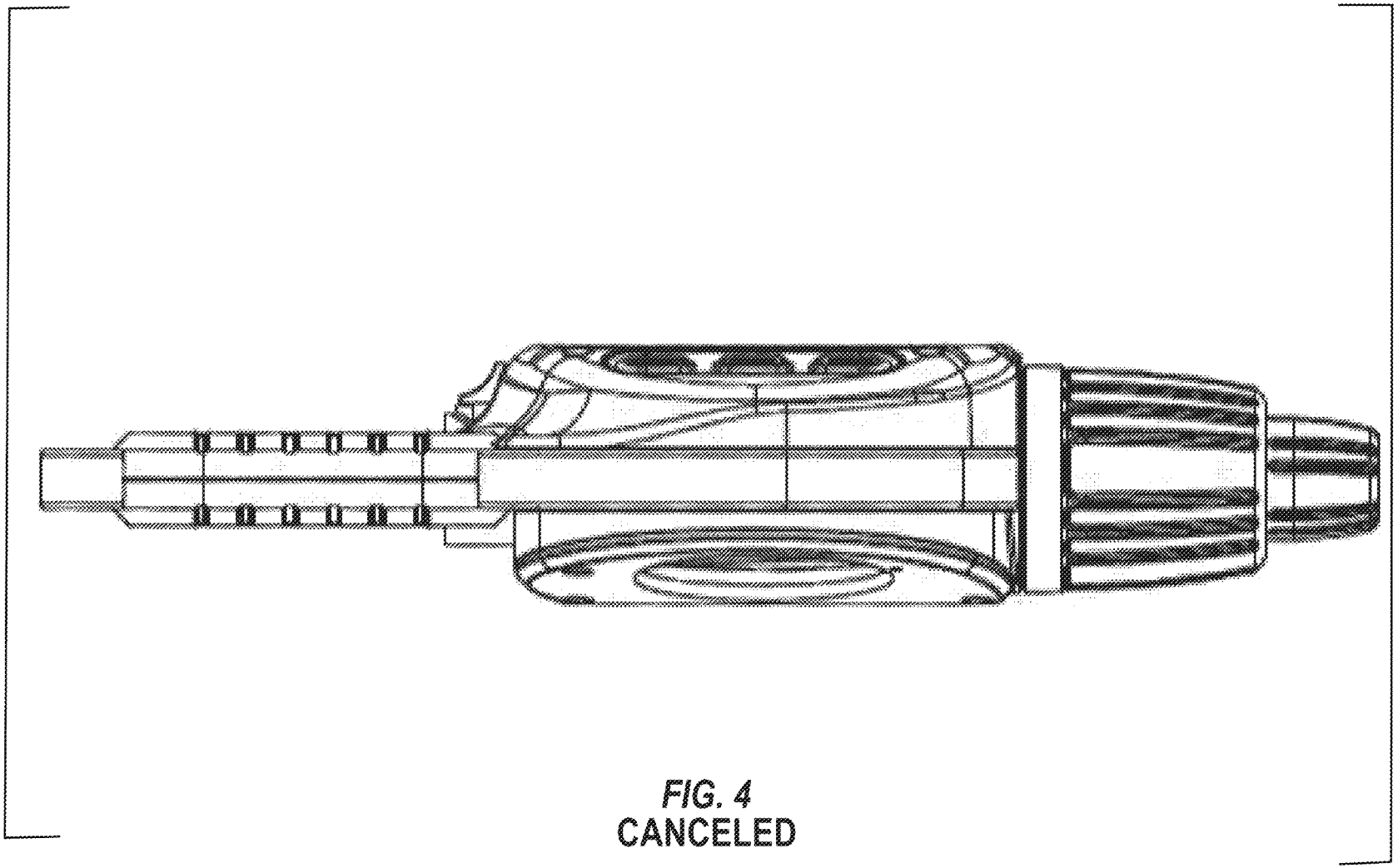
Figure 5:
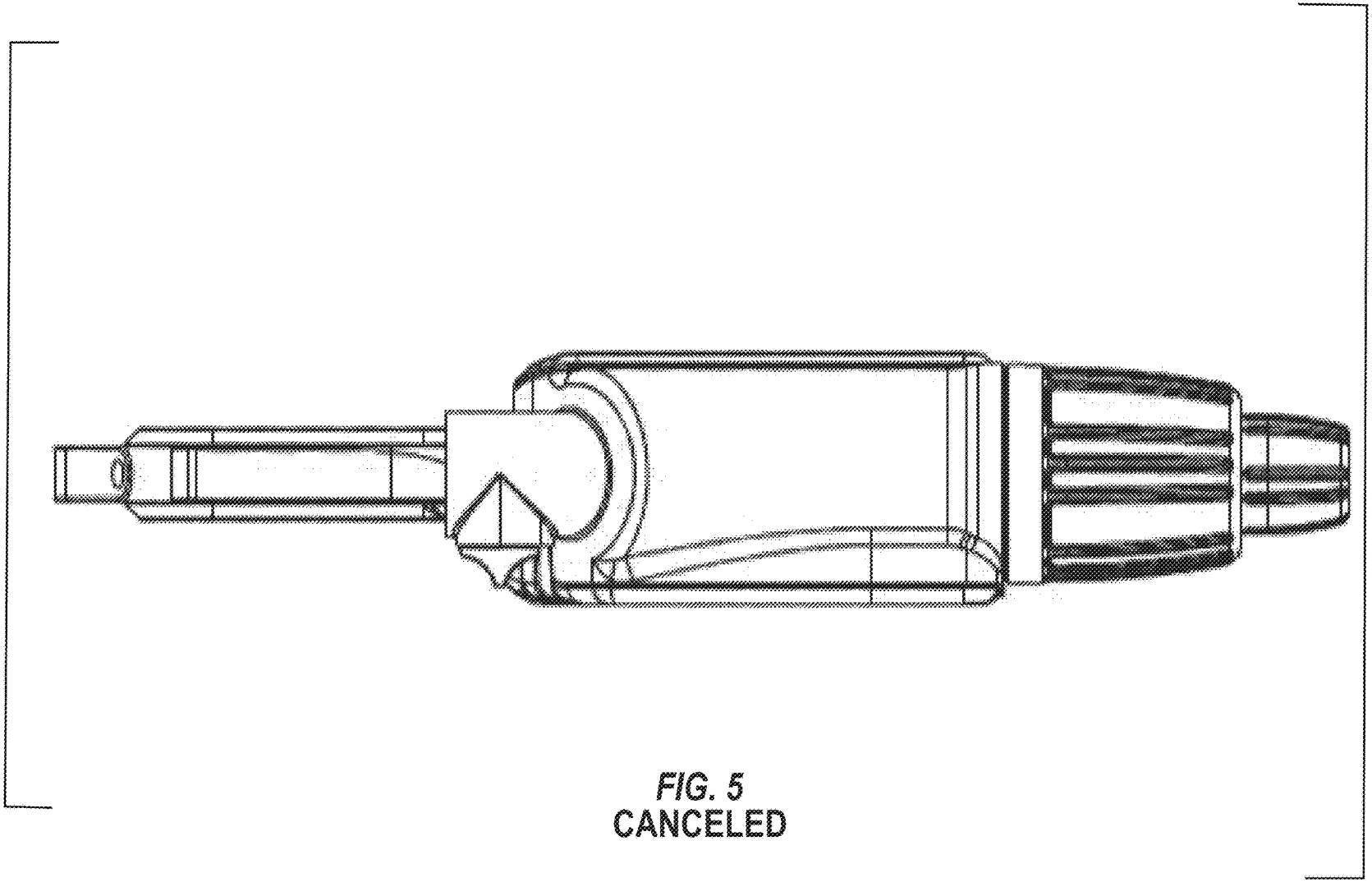
Figure 6:
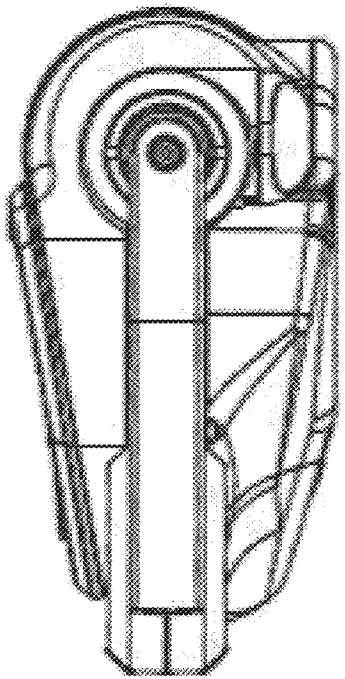
Figure 7:
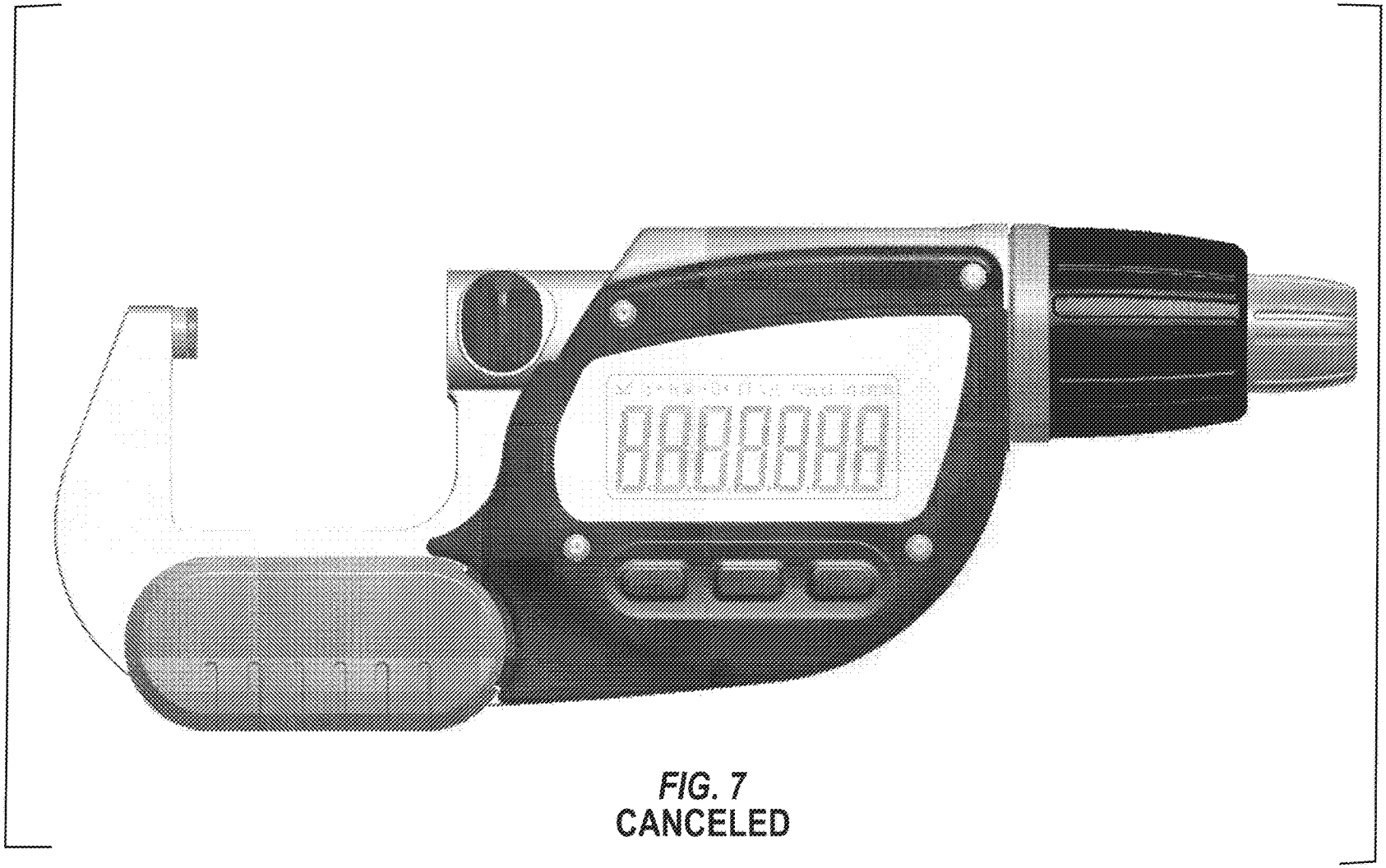
Figure 8:
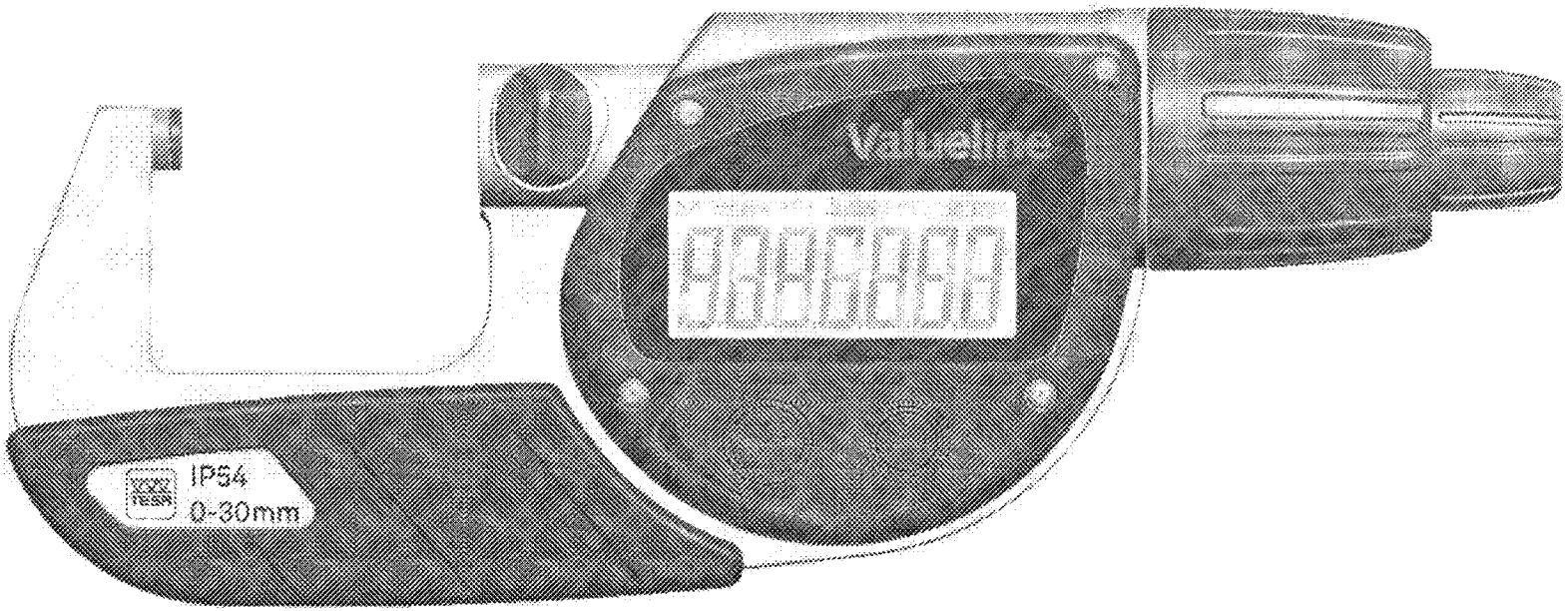

Matter enclosed in heavy brackets [ ] appears in the original patent but forms no part of this reissue; matter printed in italics indicates the additions made by reissue.

NEW

(56) References Cited

U.S. PATENT DOCUMENTS

| | | | | | |
|---|---|---|---|---|---|
| D274,413 | S | * | 6/1984 | Sakata | D10/73 |
| D274,891 | S | * | 7/1984 | Yamamoto | D10/73 |
| D274,990 | S | * | 8/1984 | Yamamoto | D10/73 |
| 4,578,868 | A | * | 4/1986 | Sasaki et al. | 33/819 |
| D286,141 | S | * | 10/1986 | Shirai | D10/70 |
| 5,433,016 | A | * | 7/1995 | Tachikake et al. | 33/820 |
| 5,495,677 | A | * | 3/1996 | Tachikake et al. | 33/784 |
| 5,691,646 | A | * | 11/1997 | Sasaki | 324/662 |
| D391,180 | S | * | 2/1998 | Thomas | D10/73 |
| 5,920,198 | A | * | 7/1999 | Suzuki et al. | 324/662 |
| D412,675 | S | * | 8/1999 | Adler | D10/73 |
| D429,172 | S | * | 8/2000 | Reymond | D10/73 |
| 6,247,244 | B1 | * | 6/2001 | Zanier et al. | 33/819 |
| 6,308,433 | B1 | * | 10/2001 | Takahashi et al. | 33/819 |
| D611,371 | S | * | 3/2010 | Ohtani et al. | D10/73 |
| D614,054 | S | * | 4/2010 | Fujikawa | D10/73 |
| D729,659 | S | * | 5/2015 | Asano | D10/73 |
| 2011/0247231 | A1 | * | 10/2011 | Hayashida | G01B 3/18 33/815 |
| 2013/0091720 | A1 | * | 4/2013 | Hayashida | G01B 3/18 33/819 |
| 2013/0276319 | A1 | * | 10/2013 | Tsuji | G01B 3/18 33/819 |
| 2015/0059196 | A1 | * | 3/2015 | Asano | G01B 3/18 33/831 |

* cited by examiner

CANCELED

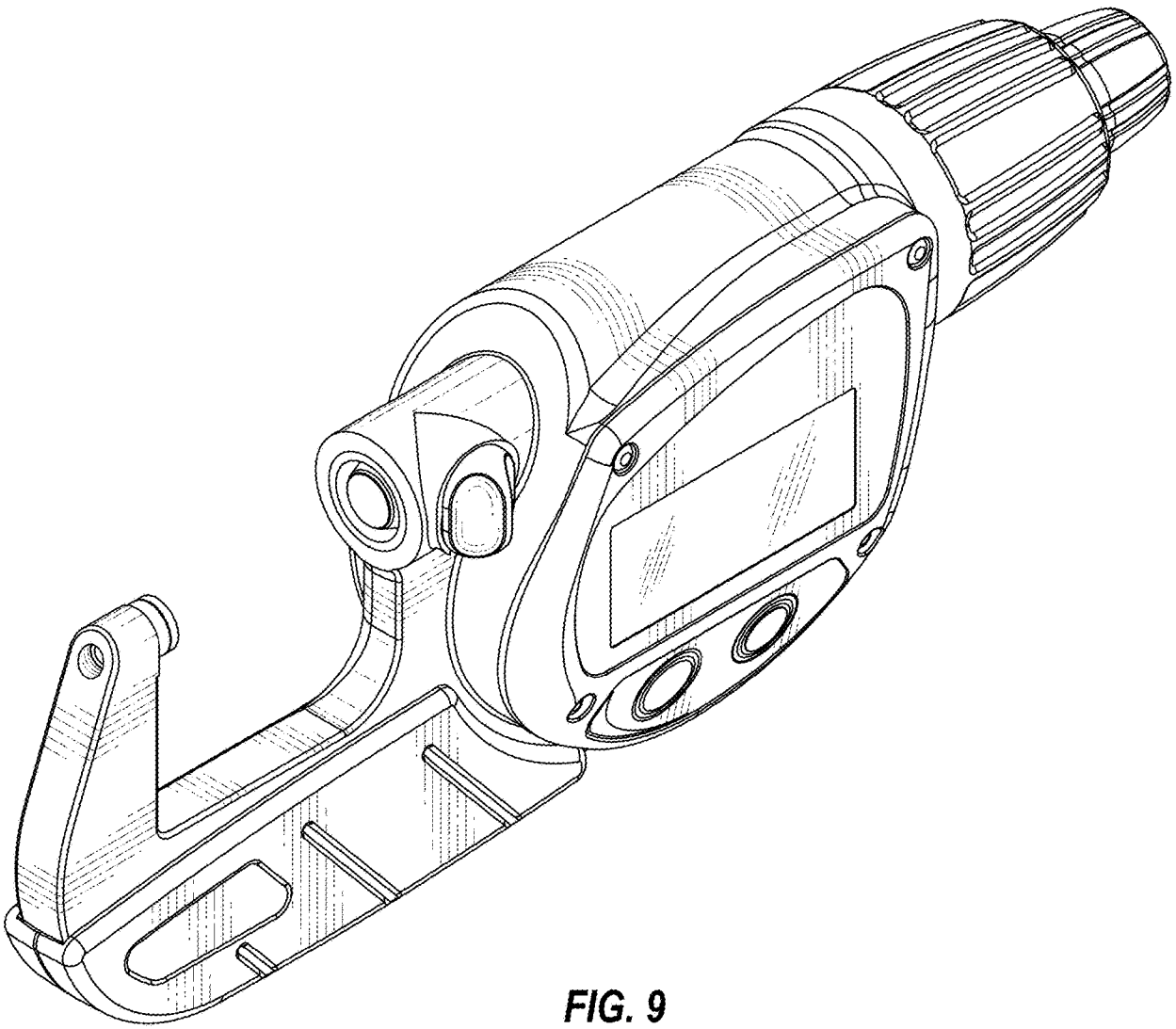
FIG. 9
NEW

CANCELED

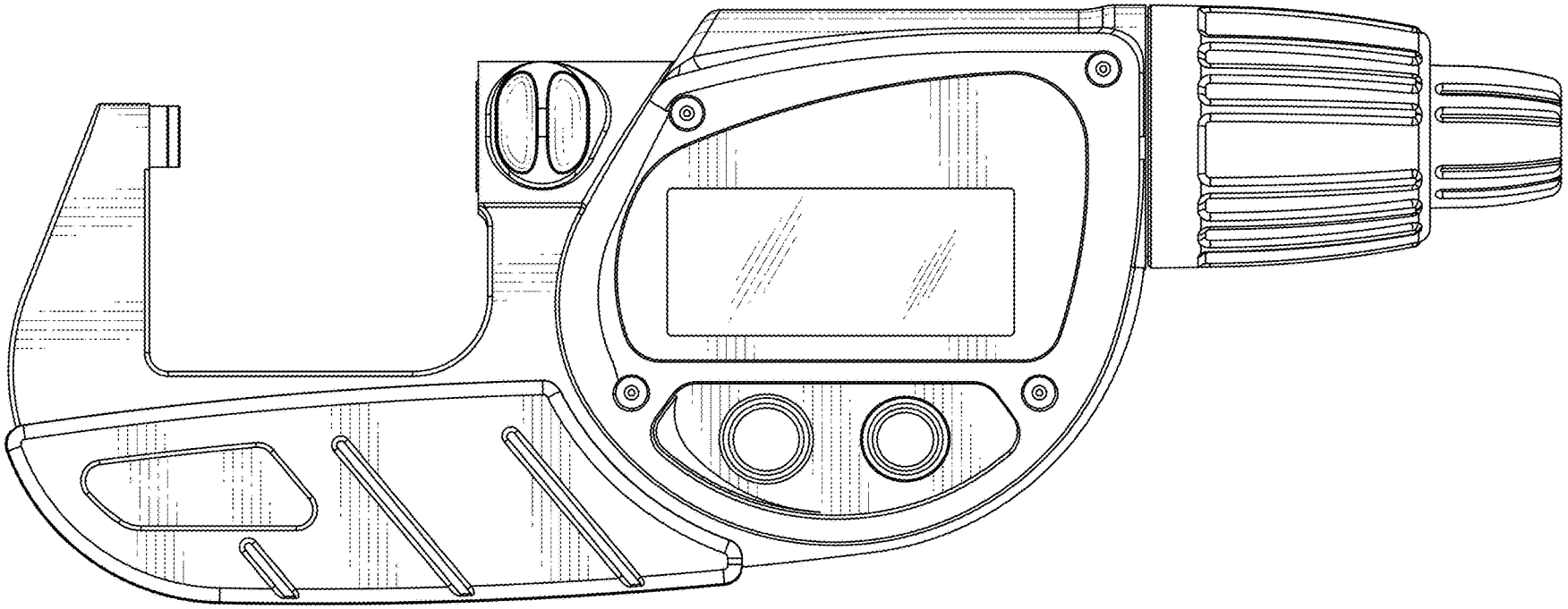
FIG. 10
NEW

CANCELED

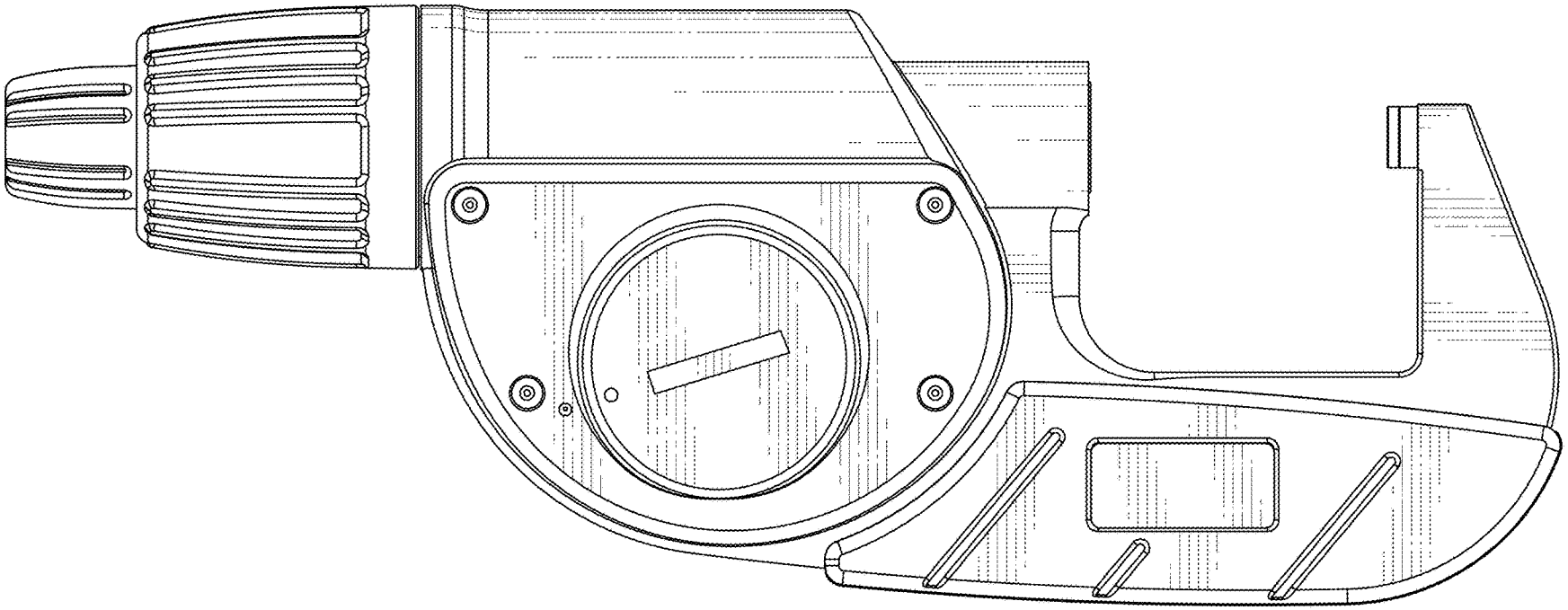
FIG. 11
NEW

CANCELED

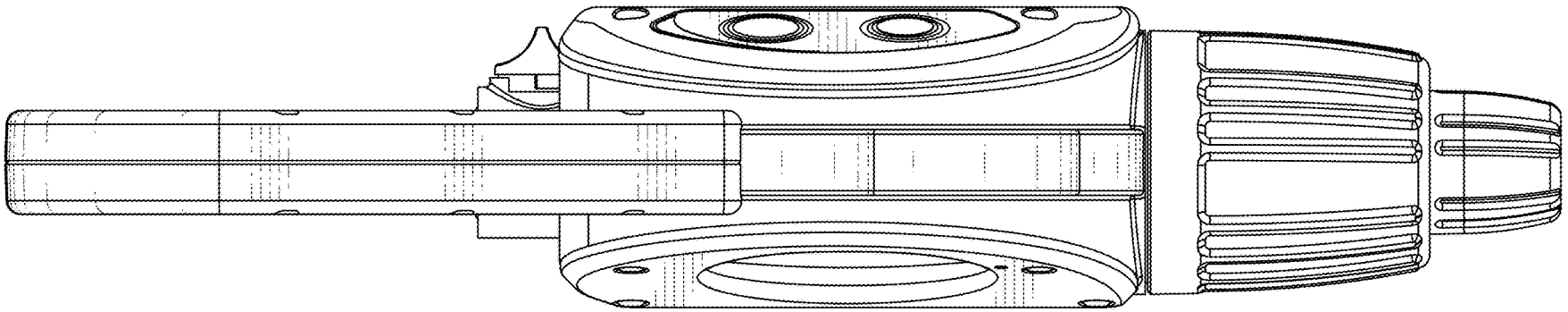
FIG. 12
NEW

CANCELED

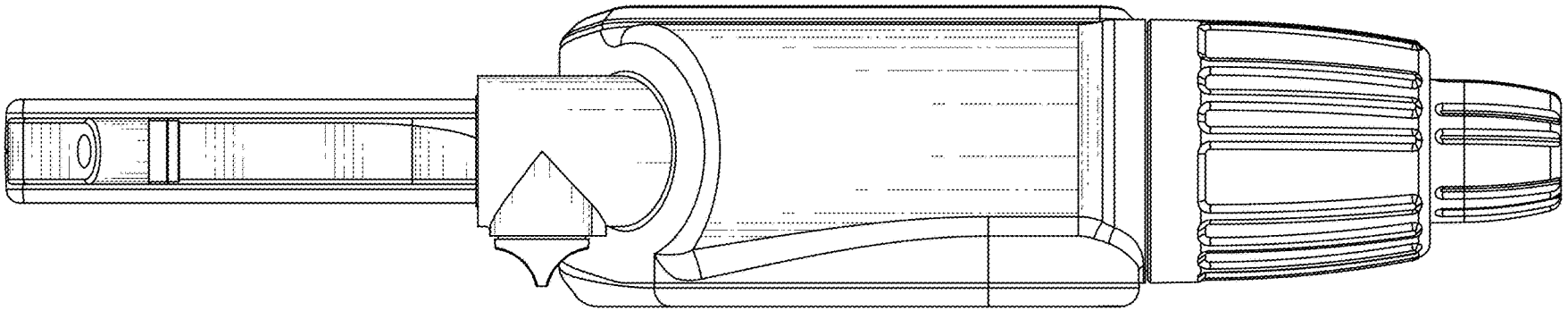
FIG. 13
NEW

CANCELED

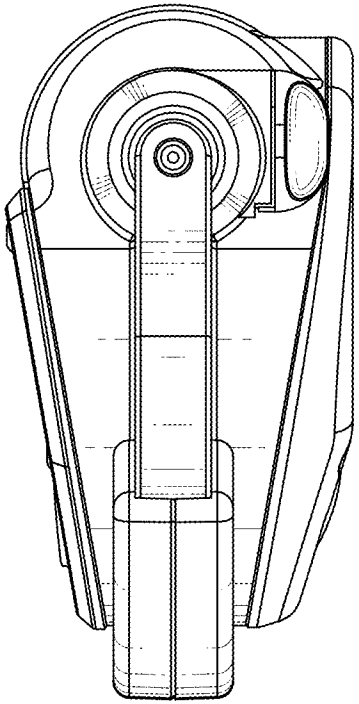
FIG. 14
NEW

CANCELED

CANCELED